US012656534B2

(12) United States Patent
Hwang et al.

(10) Patent No.: US 12,656,534 B2
(45) Date of Patent: Jun. 16, 2026

(54) ELECTRONIC DEVICE HOUSING AND ELECTRONIC DEVICE INCLUDING THEREOF

(71) Applicant: Samsung Electronics Co., Ltd., Gyeonggi-do (KR)

(72) Inventors: Jungho Hwang, Gyeonggi-do (KR); Changsu Kim, Gyeonggi-do (KR); Sangsik Na, Gyeonggi-do (KR); Sungho Cho, Gyeonggi-do (KR); Hangyu Hwang, Gyeonggi-do (KR); Junpil Kim, Gyeonggi-do (KR); Jinho Kim, Gyeonggi-do (KR); Jinshik Lim, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 463 days.

(21) Appl. No.: 17/990,858

(22) Filed: Nov. 21, 2022

(65) Prior Publication Data

US 2023/0111297 A1 Apr. 13, 2023

Related U.S. Application Data

(63) Continuation of application No. PCT/KR2022/015319, filed on Oct. 12, 2022.

(30) Foreign Application Priority Data

Oct. 13, 2021 (KR) ........................ 10-2021-0135867

(51) Int. Cl.
*B32B 3/30* (2006.01)
*G02B 1/14* (2015.01)
(Continued)

(52) U.S. Cl.
CPC ............... *G02B 1/14* (2015.01); *G06F 3/041* (2013.01); *G06F 2203/04103* (2013.01)

(58) Field of Classification Search
CPC ..... B32B 3/30; H04M 1/0283; H05K 5/0243; H05K 5/0018
See application file for complete search history.

(56) References Cited

U.S. PATENT DOCUMENTS 6,967,053 B1 * 11/2005 Mullen .................. A42B 3/061
359/530
7,102,744 B2 9/2006 Marxer et al.
(Continued)

FOREIGN PATENT DOCUMENTS

CN 112014914 A 12/2020
JP 2005-88318 A 4/2005
(Continued)

OTHER PUBLICATIONS

International Search Report dated Jan. 17, 2023.
Korean Office Action dated Jun. 30, 2025.

*Primary Examiner* — Joanna Pleszczynska
(74) *Attorney, Agent, or Firm* — CANTOR COLBURN LLP

(57) ABSTRACT

An electronic device and housing are disclosed herein. The electronic device includes a plurality of electronic components housed within the housing. The housing includes a substrate, a transparent coating layer formed on a front surface of the substrate, a deposition layer formed on a rear surface of the substrate, wherein the front surface of the substrate includes a first protrusion extending in a first direction outwards from the substrate, wherein the rear surface of the substrate includes a second protrusion extending in a second direction opposite to the first direction, wherein the first protrusion and the second protrusion differ in at least one their respective widths, depths or pitches, and (Continued)

wherein a first focal length of the first protrusion and a second focal length of the second protrusion are different from each other.

16 Claims, 8 Drawing Sheets

(51) Int. Cl.
| | | |
|---|---|---|
| *G06F 3/041* | (2006.01) |
| *H04M 1/02* | (2006.01) |
| *H05K 5/00* | (2025.01) |
| *H05K 5/02* | (2006.01) |

(56) References Cited

U.S. PATENT DOCUMENTS

| | | | |
|---|---|---|---|
| 8,842,239 | B2 | 9/2014 | Chen et al. |
| 2012/0015157 | A1* | 1/2012 | Chen .................... H04M 1/0283 |
| | | | 362/613 |
| 2013/0202892 | A1* | 8/2013 | Kues .................... C09D 133/14 |
| | | | 428/423.1 |

| | | | |
|---|---|---|---|
| 2015/0102212 | A1* | 4/2015 | Ruh ...................... G01J 1/0474 |
| | | | 250/237 R |
| 2015/0229745 | A1* | 8/2015 | De Wind ............ H04M 1/0266 |
| | | | 455/575.8 |
| 2016/0052227 | A1* | 2/2016 | Takihara ................. B32B 27/06 |
| | | | 428/141 |
| 2016/0101589 | A1* | 4/2016 | Ozawa .................. B32B 27/302 |
| | | | 428/141 |
| 2021/0124100 | A1* | 4/2021 | Kim .......................... B32B 3/30 |
| 2021/0168948 | A1* | 6/2021 | Tu ........................... B32B 27/06 |

FOREIGN PATENT DOCUMENTS

| | | | |
|---|---|---|---|
| KR | 10-2008-0099008 | A | 11/2008 |
| KR | 10-2011-0129214 | A | 12/2011 |
| KR | 10-2012-0040058 | A | 4/2012 |
| KR | 10-1164229 | B1 | 7/2012 |
| KR | 10-2012-0128975 | A | 11/2012 |
| KR | 10-2013-0012783 | A | 2/2013 |
| KR | 10-1271161 | B1 | 6/2013 |
| KR | 10-2016-0105110 | A | 9/2016 |
| KR | 10-2017-0066468 | A | 6/2017 |
| KR | 10-2020-0021085 | A | 2/2020 |
| KR | 10-2020-0085066 | A | 7/2020 |

* cited by examiner

300

320

330

310

311

340

350

360

370

380

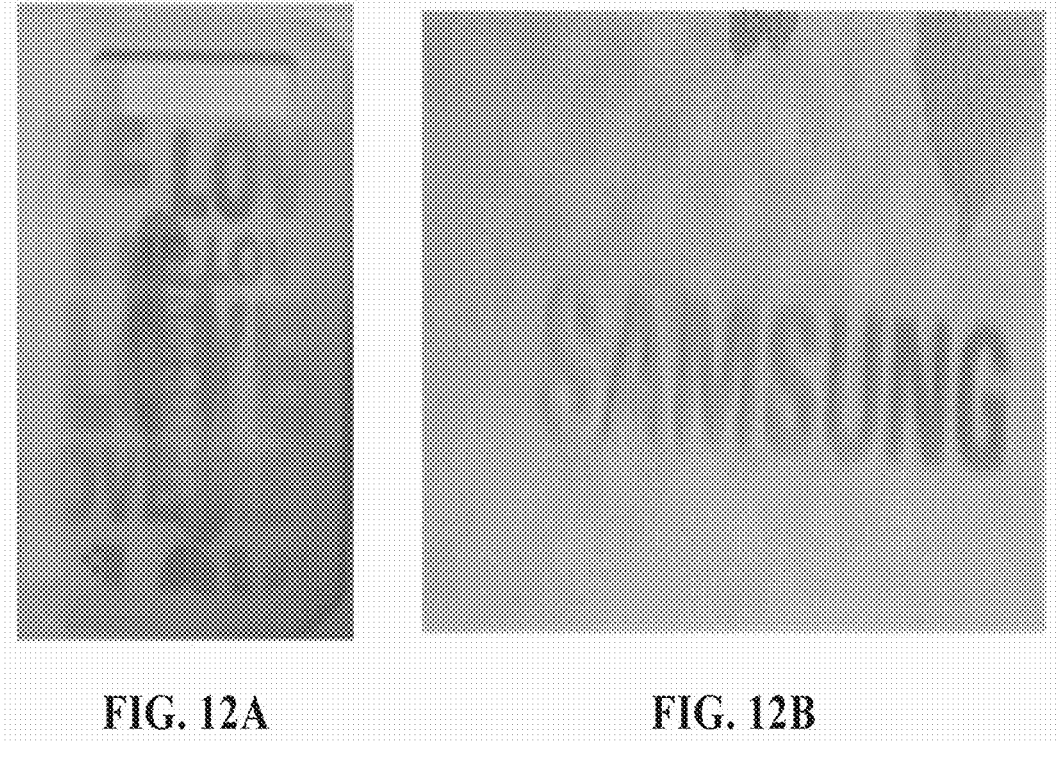
FIG. 12A                    FIG. 12B

ELECTRONIC DEVICE HOUSING AND ELECTRONIC DEVICE INCLUDING THEREOF

CROSS-REFERENCE TO RELATED APPLICATIONS

This application is a continuation application of International Application No. PCT/KR2022/015319 designating the United States, filed on Oct. 12, 2022, in the Korean Intellectual Property Receiving Office and claiming priority to Korean Patent Application No. 10-2021-0135867, filed on Oct. 13, 2021, in the Korean Intellectual Property Office, the disclosures of which are incorporated by reference herein in their entireties.

BACKGROUND

1. Technical Field

The disclosure relates to electronic device housings, and more particularly, to electronic devices housings with optical effects implemented within the surfaces thereof.

2. Description of Related Art

Modern electronic devices may execute functions according to programs installed therein. As such, they may implement a variety of roles and purposes, such as enabling remote control of home appliances, electronic notetaking, serving as portable multimedia players, mobile communication terminals, tablet personal computers (PC), video/audio devices, desktop/laptop computers, vehicle navigation systems, and the like. In some examples, electronic devices may output stored information as sound or imagery. Along with an increase in the integration of electronic devices and ultra-high-speed, large-capacity wireless communication which continue to increase in popularity and widespread use, a diversity of multiple functions have be integrated into a single electronic device. For example, a single mobile communication terminal may thus implement entertainment functions such as gaming, a multimedia functions such as music/video playback, communication and security functions for mobile banking, scheduling, and electronic wallet functions, as well as implementing traditional communication functions. In modern times, these have all been integrated into a single electronic device.

An electronic device includes a housing, which may be formed of various materials. The housing of the electronic device may protect internal components of the electronic device from an external impact and damage. In addition, the electronic device housing may be designed to enable ease of portability and provide pleasant aesthetics. Accordingly, the to electronic device housing may have high strength and hardness to protect the internal components and modules of the electronic device, and may also include gloss and other aesthetic effects to maintain a quality appearance.

SUMMARY

The electronic device may be implemented such that the surface of the electronic device housing (or case) includes a visually luxurious texture. A film (e.g., a deco film) may be attached to the surface of the electronic device housing to provide a certain aesthetic effect, but in some cases, the film may fail to uniformly adhere to an edge or curvature of the housing where two or more surfaces meet. Thus defects, such as folds and wrinkles, may be introduced, harming the aesthetics of the device.

In order to manufacture an electronic device housing that includes a 2D planar or 3D stereoscopic effect on the exterior, a lens may be molded using lens molding, as based on a planar film. Various processing methods, such as a roll press method or an ultraviolet (UV) molding method, may be applied to imprint the lens on the film, and the manufactured film may be applied specifically in the planar section thereof.

In addition, since the lens is manufactured in the form of a separate film, a separate process such as lamination or insertion method may require addition using a separate substrate. Accordingly, limitations may restrict the area that implementing the 2D or 3D effect for the electronic device housing, and aesthetic patterns may be disconnected.

The electronic device housing according to certain embodiments may provide an integrated electronic device housing by molding a protrusion having a convex shape on a substrate, which may express various appearance images for aesthetic effect, regardless of a shape of the housing substrate.

The electronic device housing according to certain embodiments may include a substrate, a transparent coating layer formed on a front surface of the substrate, a deposition layer formed on a rear surface of the substrate, wherein the front surface of the substrate includes a first protrusion extending in a first direction outwards from the substrate, wherein the rear surface of the substrate includes a second protrusion extending in a second direction opposite to the first direction, wherein the first protrusion and the second protrusion differ in at least one their respective widths, depths or pitches, and wherein a first focal length of the first protrusion and a second focal length of the second protrusion are different from each other.

The electronic device housing according to certain embodiments may include a substrate, a transparent coating layer formed on a front surface of the substrate, a deposition layer formed on a rear surface of the substrate, wherein the front surface of the substrate includes a first protrusion extending in a first direction outwards from the substrate, and a third protrusion separate from the first protrusion extending in the first direction, wherein the rear surface of the substrate includes a second protrusion extending in a second direction opposite to the first direction, and wherein two protrusions selected from among the first protrusion, the second protrusion, and the third protrusion differ in at least one of their respective widths, depths, and pitches.

According to certain embodiments, a plurality of protrusions formed on the substrate may be formed, for example, a first protrusion, a second protrusion, and a third protrusion may be formed on the surface of the substrate, or a first protrusion, a second protrusion, a third protrusion, and a fourth protrusion may be formed on the surface of the substrate.

The electronic device according to certain embodiments is surrounded by an electronic device housing, and the electronic device housing may include a substrate, a transparent coating layer formed on the front surface of the substrate, and a deposition layer formed on the rear surface of the substrate, the front surface of the substrate may include a first protrusion protruding outward from the substrate, the rear surface of the substrate may include a second protrusion protruding outward from the substrate, the first protrusion and the second protrusion may have at least one of a width, a depth, and a pitch different from each other, and the focal length of the first protrusion and the focal length of the second protrusion may be different.

According to certain embodiments, the electronic device housing may provide a housing in which a lens is integrated therein, by forming protrusions on a front surface and a rear surface of the substrate. According to certain embodiments, a focal length of the protrusion formed on the front surface and the protrusion formed on the rear surface may be different, and, accordingly, a unique electronic device housing in which a "moire" pattern is visibly formed on the exterior may be implemented.

According to certain embodiments, the electronic device housing may include an injected object formed by injection molding, which thereby includes a lens pattern. This may then express various images such as a simple 2D or 3D images and gradients, through a pattern protrusion that includes various shapes.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 12A is actual images of an electronic device to which a housing of an electronic device is applied according to certain embodiments.

FIG. 12B is actual images of an electronic device to which a housing of an electronic device is applied according to certain embodiments.

DETAILED DESCRIPTION

Figure 1:
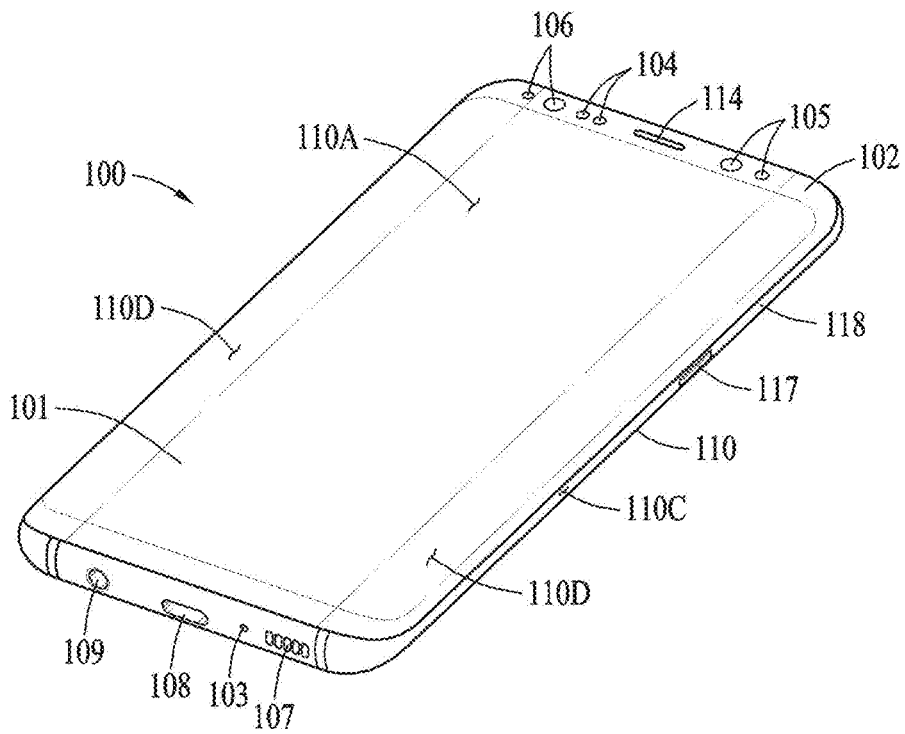
FIG. 1 is a perspective view of a front surface of a mobile electronic device according to an embodiment.

Hereinafter, example embodiments will be described in detail with reference to the accompanying drawings. When describing the example embodiments with reference to the accompanying drawings, like reference numerals refer to like elements and a repeated description related thereto will be omitted.

Figure 2:
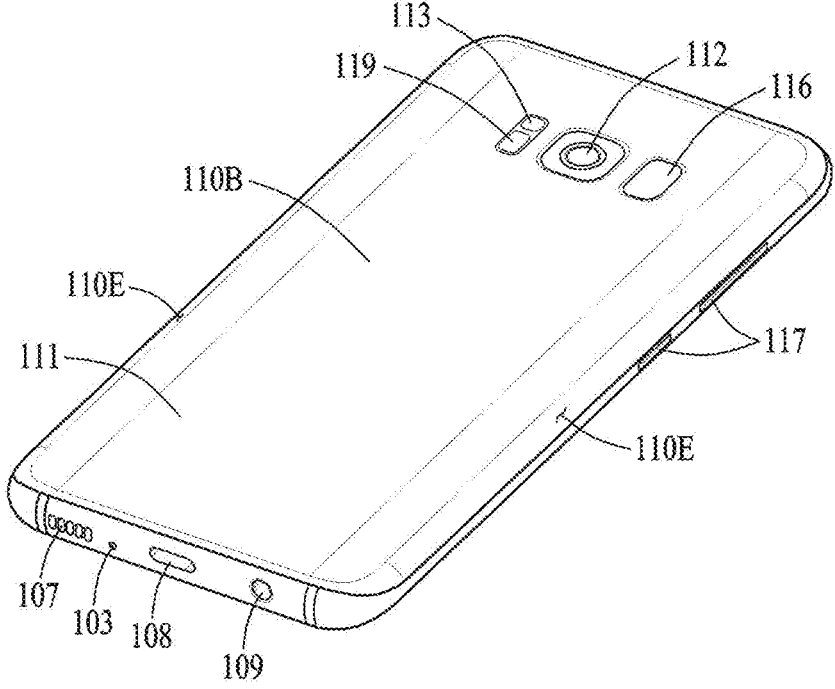
FIG. 2 is a perspective view of a rear surface of the electronic device of FIG. 1.

FIG. 1 is a perspective view of a front surface of a mobile electronic device according to an example embodiment;

FIG. 2 is a perspective view of a rear surface of the electronic device of FIG. 1.

Referring to FIGS. 1 and 2, an electronic device 100 according to an example embodiment may include a first surface (or a front surface) 110A, a second surface (or a rear surface) 110B, and a housing 110 including a side surface 110C surrounding a space between the first surface 110A and the second surface 110B. In an embodiment (not shown), the housing may also refer to a structure which forms a portion of the first surface 110A, the second surface 110B, and the side surface 110C of FIG. 1. According to an embodiment, the first surface 110A may be formed by a front plate 102 (e.g., a glass plate or a polymer plate including various coating layers) of which at least a portion is substantially transparent. The second surface 110B may be formed of a rear plate 111 that is substantially opaque. For example, the rear plate 111 may be formed of coated or colored glass, ceramic, polymer, metal materials (e.g., aluminum, stainless steel (STS), or magnesium) or a combination of at least two of the above materials. The side surface 110C may be coupled to the front plate 102 and the rear plate 111 and may be formed by a side bezel structure 118 (or a side member) including a metal and/or a polymer. In an embodiment, the rear plate 111 and the side bezel structure 118 may be integrally formed and may include the same material (e.g., a metal material such as aluminum).

In the illustrated embodiment, the front plate 102 may include two first areas 110D that are curved and extended seamlessly from the first surface 110A toward the rear plate 111 at both ends of a long edge of the front plate 102. In the illustrated embodiment (see FIG. 2), the rear plate 111 may include two second areas 110E that are curved and extended seamlessly from the second surface 110B toward the front plate 102 at both ends of a long edge thereof. In some embodiments, the front plate 102 (or the rear plate 111) may include one of the first areas 110D (or the second areas 110E). In an embodiment, some of the first areas 110D or the second area 110E may not be included. In the above embodiments, in a side view of the electronic device 100, the side bezel structure 118 may have a first thickness (or width) at a side in which the first areas 110D or the second areas 110E are not included, and may have a second thickness less than the first thickness at a side in which the first areas 110D or the second areas 110E are included. In an embodiment, the first areas 110D or the second areas 110E may be formed to be flat instead of being bent, to form a substantially single plane with the first surface 110A or the second surface 110B.

According to an embodiment, the electronic device 100 may include at least one of a display 101, audio modules 103, 107, and 114, sensor modules 104, 116, and 119, camera modules 105, 112, and 113, key input devices 117, a light-emitting element 106, and connector holes 108 and 109. In some embodiments, the electronic device 100 may not include at least one (e.g., the key input devices 117 or the light-emitting element 106) of the components, or may additionally include other components.

The display 101 may be exposed through, for example, some portions of the front plate 102. In some embodiments, at least a portion of the display 101 may be exposed through the first surface 110A and the front plate 102 implementing the first areas 110D of the side surface 110C. In some embodiments, an edge of the display 101 may be formed to be substantially the same as the shape of the periphery of the front plate 102 adjacent thereto. In another embodiment (not shown), in order to enlarge the exposed area of the display 101, a distance between the periphery of the display 101 and the periphery of the front plate 102 may be substantially the same.

In another embodiment (not shown), a recess or an opening may be formed in a portion of a screen display area of the display 101, and at least one of the audio module 114, the sensor module 104, the camera module 105, and the light-emitting element 106 that are aligned with the recess or the opening may be included. In another embodiment (not shown), a rear surface of the screen display area of the display 101 may include at least one of the audio module 114, the sensor module 104, the camera module 105, the fingerprint sensor 116, and the light-emitting element 106. In another embodiment (not shown), the display 101 may be coupled to or disposed adjacent to a touch sensing circuit, a pressure sensor capable of measuring an intensity (pressure) of the touch, and/or a digitizer detecting a magnetic-type stylus pen. In some embodiments, at least a portion of the sensor modules 104 and 119 and/or at least a portion of the key input device 117 may be disposed in the first areas 110D and/or the second areas 110E.

The audio modules 103, 107, and 114 may include a microphone hole and speaker holes. A microphone for obtaining external sound may be disposed inside the microphone hole. In some embodiments, a plurality of microphones may be disposed to sense a direction of the sound. The speaker holes may include an external speaker hole and a receiver hole for calls. In some embodiments, the speaker holes and the microphone hole may be implemented as one hole, or a speaker may be included without the speaker holes (e.g., a piezo speaker).

The sensor modules 104, 116, and 119 may generate an electrical signal or data value corresponding to an internal operating state of the electronic device 100 or an external environmental state. The sensor modules 104, 116, and 119 may include, for example, a first sensor module 104 (e.g., a proximity sensor) and/or a second sensor module (not shown) (e.g., a fingerprint sensor) disposed on the first surface 110A of the housing 110, and/or a third sensor module 119 (e.g., a heart rate monitoring (HRM) sensor) and/or a fourth sensor module 116 (e.g., a fingerprint sensor) disposed on the second surface 110B of the housing 110. The fingerprint sensor may be disposed on both the first surface 110A (e.g., the display 101) and the second surface 110B of the housing 110. The electronic device 100 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor 104.

The camera modules 105, 112, and 113 may include a first camera device 105 disposed on the first surface 110A of the electronic device 100, a second camera device 112 and/or a flash 113 disposed on the second surface 110B. The camera modules 105 and 112 may each include one or more lenses, an image sensor, and/or an image signal processor. The flash 113 may include, for example, a light-emitting diode (LED) or a xenon lamp. In some embodiments, two or more lenses (e.g., IR camera, wide-angle, and telephoto lenses) and image sensors may be disposed on one surface of the electronic device 100.

The key input device 117 may be disposed on the side surface 110C of the housing 110. In another embodiment, the electronic device 100 may not include some or all of the above-described key input devices 117. The key input device 117 that is not included may be implemented in another form such as a soft key on the display 101. In some embodiments, the key input devices may include the sensor module 116 disposed on the second surface 110B of the housing 110.

The light-emitting element 106 may be disposed on, for example, the first surface 110A of the housing 110. The light-emitting element 106 may provide, for example, state information of the electronic device 100 in a form of light. In another embodiment, the light-emitting element 106 may provide, for example, a light source that is linked to an operation of the camera module 105. The light-emitting element 106 may include, for example, an LED, an IR LED, and a xenon lamp.

The connector holes 108 and 109 may include a first connector hole 108 for accommodating a connector (e.g., a universal serial bus (USB) connector) for transmitting and receiving power and/or data to and from an external electronic device, and/or a second connector hole 109 (e.g., an earphone jack) for accommodating a connector for transmitting and receiving an audio signal to and from an external electronic device.

Figure 3:
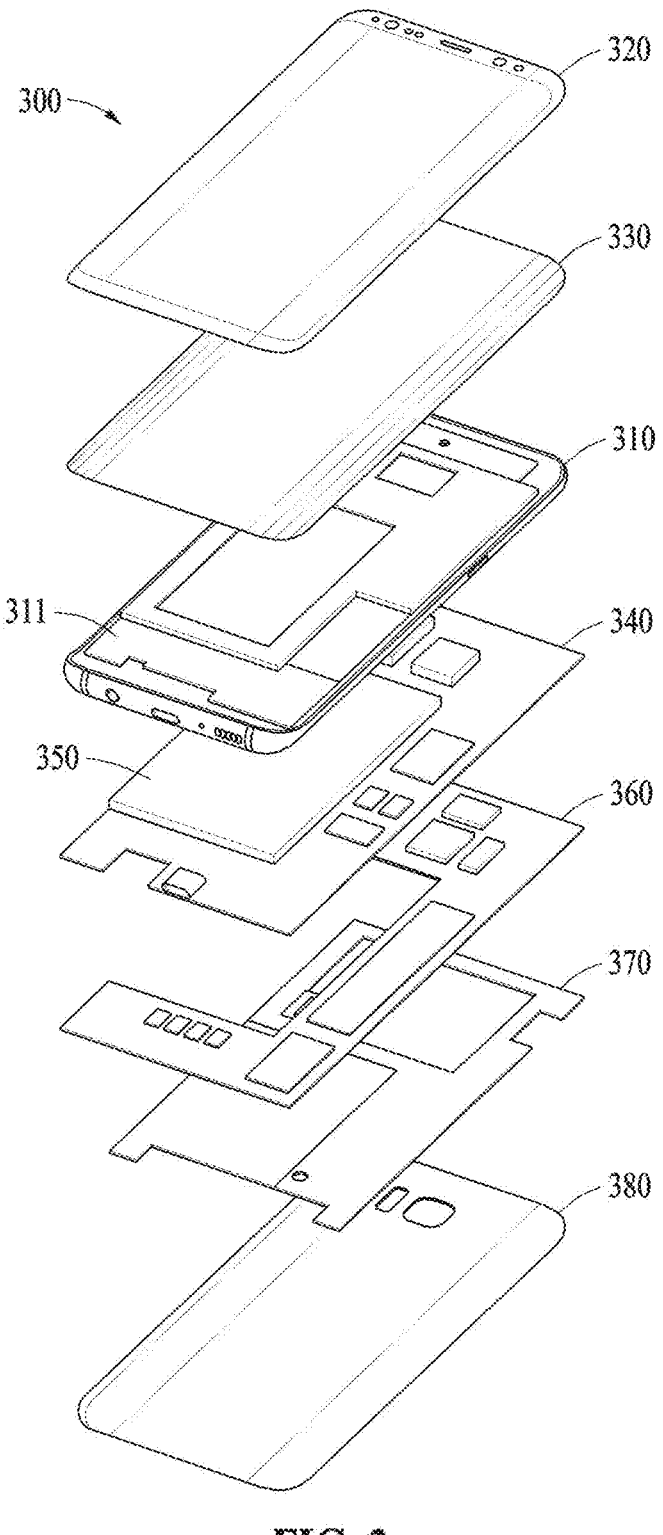
FIG. 3 is an exploded perspective view of the electronic device of FIG. 1.

FIG. 3 is an exploded perspective view of the electronic device of FIG. 1.

Referring to FIG. 3, an electronic device 300 may include a side bezel structure 310, a first supporting member 311 (e.g., a bracket), a front plate 320, a display 330, a printed circuit board (PCB) 340, a battery 350, a second supporting member 360 (e.g., a rear case), an antenna 370, and a rear plate 380. In some embodiments, the electronic device 300 may not include at least one (e.g., the first supporting member 311 or the second supporting member 360) of the components or may additionally include other components. At least one of the components of the electronic device 300 may be the same as or similar to at least one of the components of the electronic device 100 of FIG. 1 or 2, and a repeated description thereof will be omitted hereinafter.

The first supporting member 311 may be disposed inside the electronic device 300 and connected to the side bezel structure 310, or may be formed integrally with the side bezel structure 310. The first supporting member 311 may be formed of, for example, a metal material and/or a non-metal material (e.g., polymer). The display 330 may be connected to one surface of the first supporting member 311, and the PCB 340 may be connected to another surface of the first supporting member 311. A processor, a memory, and/or an interface may be mounted on the PCB 340. The processor may include, for example, one or more of a central processing unit, an application processor, a graphics processing unit, an image signal processor, a sensor hub processor, and a communication processor.

The memory may include, for example, a volatile memory or a non-volatile memory.

The interface may include, for example, a high-definition multimedia interface (HDMI), a USB interface, a secure digital (SD) card interface, or an audio interface. For example, the interface may electrically or physically connect the electronic device 300 to an external electronic device, and may include a USB connector, an SD card/multimedia card (MMC) connector, or an audio connector.

The battery 350, which is a device for supplying power to at least one component of the electronic device 300, may include, for example, a primary cell that is not rechargeable, a secondary cell that is rechargeable, or a fuel cell. For example, at least a portion of the battery 350 may be disposed on substantially the same plane as the PCB 340. The battery 350 may be disposed integrally inside the electronic device 300, or disposed detachably from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. For example, the antenna 370 may perform short-range communication with an external device, or may wirelessly transmit and receive power utilized for charging to and from the external device. In an embodiment, an antenna structure may be formed by a portion of the side bezel structure 310 and/or the first supporting member 311 or a combination thereof. The electronic device 100 according to certain embodiments of the present disclosure may include an electronic device such as a bar type, a foldable type, a rollable type, a slidable type, a wearable type, a tablet personal computer (PC) and/or a notebook PC. The electronic device 100 according to certain embodiments of the present disclosure is not limited to the above-described example, and may include various other electronic devices.

Figure 4:
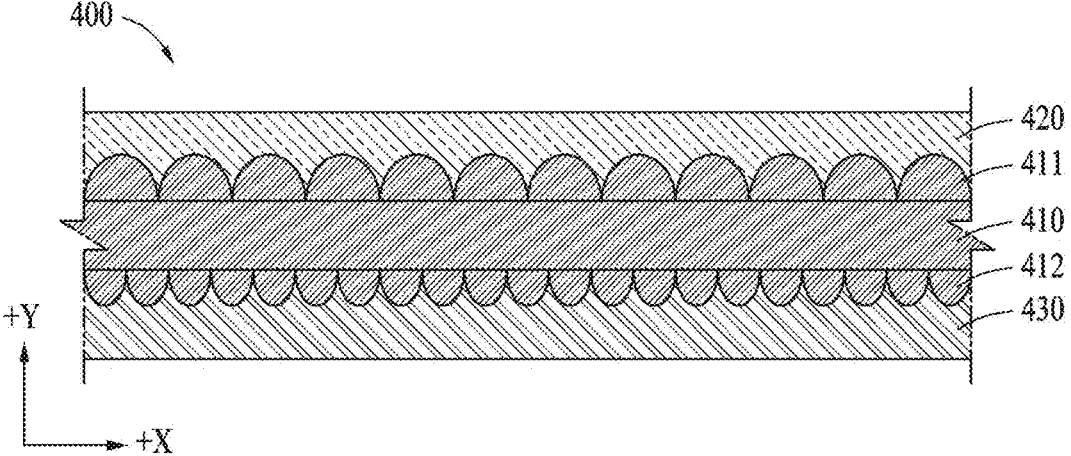
FIG. 4 is a cross-sectional view of a housing of an electronic device according to certain embodiments.

FIG. 4 is a cross-sectional view of a housing of an electronic device according to certain embodiments.

According to certain embodiments, an electronic device housing 400 may include a substrate 410, a transparent coating layer 420 formed on a front surface of the substrate 410, and a deposition layer 430 formed on a rear surface of the substrate 410.

According to certain embodiments, a protrusion may be formed on the surface of the substrate 410. For example, a protrusion may be formed on one surface of the sheet-shaped substrate 410, or a first protrusion may be formed on one surface and a second on the opposite surface of the one surface. According to certain embodiments, a protrusion may be formed on a surface in a +Y direction and/or a surface in a −Y direction of the substrate 410.

According to certain embodiments, the front surface and the rear surface may indicate a first surface and an opposite second surface of the one surface based on the object. For example, when the surface of the substrate 410 in the +Y direction is referred to as the "front" surface, the surface of the substrate 410 in the −Y direction may be referred to as the "rear" surface. According to certain embodiments, a protrusion may be formed on the front surface and the rear surface of the substrate 410.

According to certain embodiments, the "protrusion" may extend outward from the electronic device housing, so as to form a convex shape, and may thus serve as a convex lens refracting light passing through the electronic device housing.

According to certain embodiments, the front surface (e.g., the surface in the +Y direction of the substrate 410) of the substrate 410 may include a first protrusion 411 extending in a first direction (e.g., the +Y direction) from the substrate 410 toward the exterior of the device. According to certain embodiments, the rear surface (e.g., the surface in the +Y direction of the substrate 410) of the substrate 410 may include a second protrusion 412 extending in a second direction (e.g., the +Y direction) opposite to the first direction (e.g., the +Y direction). According to certain embodiments, the first protrusion 411 and the second protrusion 412 may extend in a direction toward the exterior from the substrate 410, and it should be understood that there is no limitation in shape and size thereof.

According to certain embodiments, the transparent coating layer 420 may be formed so as to contact the exterior environment, to protect the electronic device housing 400 and the substrate 410, and may reduce corrosion, contamination, scratches, and/or wear of the electronic device housing 400 that may occur due to an external environment. According to certain embodiments, the transparent coating layer 420 may allow passthrough of light that enters and exits the electronic device housing 400 from the exterior.

According to certain embodiments, the deposition layer 430 may be formed on the rear surface of the substrate 410. According to certain embodiments, the deposition layer 430 may include a metal component, for example, various metal materials such as indium, titanium oxide, aluminum oxide, silver powder, or silicon oxide, and may increase the reflectivity of the electronic device housing 400 to provide pleasing aesthetics.

According to certain embodiments, the deposition layer 430 may be formed on the rear surface of the substrate 410. According to certain embodiments, the deposition layer 430 may include a metal paint, and desirably, may further include a glass beads. For example, the deposition layer 430 may include various metal paints such as indium, titanium oxide, aluminum oxide, silver powder, or silicon oxide, and glass beads may be included in the metal paint. According to certain embodiments, the deposition layer 430 may include glass beads. According to certain embodiments, glass beads may increase the reflectivity of the electronic device housing 400 to increase the aesthetic attractiveness of the device.

According to certain embodiments, a plurality of first protrusions 411 may be formed. According to certain embodiments, a plurality of second protrusions 412 may be formed. According to certain embodiments, the shapes of the first protrusion 411 and the second protrusion 412 may be determined according to a shape of a mold for manufacturing the substrate 410, and specifically, may be determined according to a pattern of an "intaglio" shape engraved on the mold.

According to certain embodiments, the transparent coating layer 420 may include at least one ultraviolet (UV) curable resin of a urethane-based resin, an epoxy-based resin, and an acrylate-based resin. According to certain embodiments, the transparent coating layer 420 may have a refractive index of 1.5 or less depending on the lens design dimension specification. According to certain embodiments, the refractive index of the transparent coating layer 420 may be desirably 1.4 or less, and the refractive index may be 1.3 or less, or 1.2 or less.

According to certain embodiments, the substrate 410 may include a plane and a curved surface. According to certain embodiments, the substrate 410 may have a cover shape to protect one surface and a side surface of the electronic device, and in this case, the substrate 410 may be formed in a curved surface at a portion connected to the side surface of the electronic device. According to certain embodiments, the front surface and the rear surface of the substrate 410 may include a first protrusion 411 and a second protrusion 412, respectively, and as the substrate 410 includes a curved surface, the first protrusion 411 and the second protrusion 412 may be formed on the curved surface of the substrate 410.

According to certain embodiments, the first protrusion 411 may include a certain width, a depth, and a pitch. According to certain embodiments, the depth of the first protrusion 411 may be measured based on a virtual area or surface extending an area in which the first protrusion 411 is not formed on the front surface of the substrate 410, and in this case, a distance from the highest point of the first protrusion 411 to the virtual area or the surface may be measured with the depth of the first protrusion 411. According to certain embodiments, the width of the first protrusion 411 may be measured based on a virtual line or surface extending an area in which the first protrusion 411 is not formed on the front surface of the substrate 410, and in this case, the width of the first protrusion 411 may be measured based on a cross-section of the first protrusion 411 and a distance between two points that meet the virtual line or the surface may be measured with the width of the first protrusion 411. According to certain embodiments, the pitch of the first protrusion 411 may indicate a distance between the first to protrusions 411 and may also indicate a minimum distance between central axes of each of the first protrusions 411. According to certain embodiments, the width, depth, and pitch of the first protrusion 411 may indicate an average width, an average depth, and an average pitch, respectively. Hereinafter, the reference may be applied to measure the width, depth, and pitch to protrusions other than the first protrusion 411.

For example, the depth of the second protrusion 412 may be measured based on a virtual area or a surface extending an area in which the second protrusion 412 is not formed on the rear surface of the substrate 410, and in this case, a distance from the highest point of the second protrusion 412 to the virtual area or the surface may be measured with the depth of the second protrusion 412. According to certain embodiments, the width of the second protrusion 412 may be measured based on a virtual line or a surface extending an area in which the second protrusion 412 is not formed on the rear surface of the substrate 410, and in this case, the width of the second protrusion 412 may be measured based on the cross-section of the second protrusion 412, and a distance between two points that meet the virtual line or surface may be measured by the width of the second protrusion 412. According to certain embodiments, the pitch of the second protrusion 412 may indicate an interval between the second protrusions 412 and may also indicate a minimum distance among the intervals between the central axes of each of the second protrusions 412. According to certain embodiments, the width, depth, and pitch of the second protrusion 412 may indicate an average width, an average depth, and an average pitch, respectively.

According to certain embodiments, the first protrusion 411 and the second protrusion 412 may have at least one of a width, a depth, and a pitch different from each other. For example, the first protrusion 411 and the second protrusion 412 may have different widths, different depths, or different pitches. According to an embodiment of FIG. 4, the first protrusion 411 and the second protrusion 412 may have the same depth but have different widths and pitches.

According to certain embodiments, the protrusion may have a unique focal length. According to certain embodiments, the focal length of the first protrusion 411 and the focal length of the second protrusion 412 may be different. According to certain embodiments, the protrusion includes a protruding shape, and accordingly, the protrusion may function as a convex lens, and as such, incident light that is parallel with the central axis of the protrusion may be refracted to meet the central axis at one point, and a distance from the protrusion to the one point may correspond to the focal length. According to certain embodiments, the focal length of the first protrusion 411 and the focal length of the second protrusion 412 are different, and accordingly, light passing through the first protrusion 411 and the second protrusion 412 may cause refraction and interference to form a visible moire pattern.

According to certain embodiments, the substrate 410 may include at least one of styrene-acrylonitrile (SAN), polymethyl methacrylate (PMMA), polycarbonate (PC), acrylonitrile butadiene styrene (ABS), polybutylene terephthalate (PBT), polyethylene terephthalate (PET), and polyoxymethylene (POM). According to certain embodiments, the substrate 410 may be transparent or substantially transparent, may include a semi-transparent material, and light may be incident through the transparent coating layer 420 of the electronic device housing 400.

According to certain embodiments, light passing through and/or reflected by the electronic device housing 400 may appear enlarged through the electronic device housing 400 by interference and refraction, and a pattern will be formed by the overlapping light from the first protrusion 411 and the second protrusion 412, thereby implementing the patterned aesthetic in the exterior of the electronic device housing 400.

According to example embodiments, the substrate 410 may be formed by injection molding. According to certain embodiments, the mold used therein may include a plurality of patterns and may include a pattern of an intaglio shape. According to certain embodiments, the mold for manufacturing the substrate 410 may be suitable for implementing a sheet-shaped injected object and forming two or more protrusions including two or more intaglio patterns, such as a first pattern and a second pattern.

According to certain embodiments, two or more patterns (e.g., the first pattern and the second pattern) may have at least one of a width, a depth, and a pitch different from each other. According to certain embodiments, the first pattern and the second pattern may include a plurality of dimples or a plurality of slits, and each of the first pattern and the second pattern may correspond to the first protrusion 411 formed on the front surface of the substrate 410 and the second protrusion 412 formed on the rear surface of the substrate 410 according to an embodiment of FIG. 4.

According to certain embodiments, the substrate 410 may be formed by injection molding. According to certain embodiments, the substrate 410 may be formed by injecting at least one polymer of SAN, PMMA, PC, ABS, PBT, PET, and POM through a mold. For example, the substrate 410 having the first protrusion 411 and the second protrusion 412, and the electronic device housing 400 including the same, may be manufactured through a process of injecting an ultraviolet curing resin into a mold having a pattern, injecting a polymer resin into the mold, compressing it, and irradiating it with ultraviolet rays to UV-cure the resultant product.

According to certain embodiments, the substrate 410 formed by injection molding may be subject to a post-processing process such as cutting and engraving. For example, the substrate 410 may cut the first protrusion part 411 formed on the front surface of the substrate 410 and the second protrusion part 412 formed on the rear surface of substrate 410 using a 5-axis processing machine. The 5-axis processing machine is a processing machine having a total of 5 axes including three orthogonal axes and two rotation axes and may process one surface of the substrate 410 and then rotate the rotation axis by a desired angle to process another surface. According to another embodiment, the substrate 410 may be subject to a post-processing process using vibration engraving or laser processing.

According to various example embodiments, at least one of the first protrusion 411 and the second protrusion 412 may be formed to have a hemispherical shape. According to certain embodiments, the hemispherical protrusion may not have a three-dimensional effect constraint according to a direction, and the post-processing may be more easily performed. According to certain embodiments, the first protrusion 411 and the second protrusion 412 are formed on the front and rear surfaces of the substrate 410, respectively, which may thereby implement a 3D image with depth.

According to certain embodiments, the first protrusion 411 and the second protrusion 412 may have different widths and/or depths.

According to certain embodiments, the first protrusion 411 may have a width of about 50 μm to about 150 μm.

According to certain embodiments, the width of the first protrusion 411 is about 50 μm or more, about 60 μm or more, about 70 μm or more, about 80 μm or more, about 90 μm or more, about 100 μm or more, about 110 μm or more, about 120 μm or more, about 130 μm or more, or about 140 μm or more, about 150 μm or less, about 140 μm or less, about 130 μm or less, about 120 μm or less, about 110 μm or less, about 100 μm or less, about 90 μm or less, about 80 μm or less, about 70 μm or less, or about 60 μm or less, or may fall within a range between two values selected from among the above-mentioned values.

According to certain embodiments, the first protrusion 411 may have a depth of about 10 μm to about 30 μm. According to certain embodiments, the depth of the first protrusion 411 is about 10 μm or more, about 15 μm or more, about 20 μm or more, or about 25 μm or more, or about 30 μm or less, about 25 μm or less, about 20 μm or less, or about 15 μm, or may fall within a range between two values selected from among the above-mentioned values.

According to certain embodiments, the second protrusion 412 may have a width of about 70 μm to about 180 μm. According to certain embodiments, the width of the second protrusion 412 is about 70 μm or more, about 80 μm or more, about 90 μm or more, about 100 μm or more, about 110 μm or more, about 120 μm or more, about 130 μm or more, about 140 μm or more, about 150 μm or more, about 160 μm or more, or about 170 μm or more, or about 180 μm or less, about 170 μm or less, about 160 μm or less, about 150 μm or less, about 140 μm or less, about 130 μm or less, about 120 μm or less, about 110 μm or less, about 100 μm or less, about 90 μm or less, or about 80 μm or less, or may fall within a range between two values selected from the above-mentioned values.

According to certain embodiments, the second protrusion 412 may have a depth of about 10 μm to about 30 μm. According to certain embodiments, the depth of the second protrusion 412 is about 10 μm or more, about 15 μm or more, about 20 μm or more, or about 25 μm or more, or about 30 μm or less, about 25 μm or less, about 20 μm or less, or about 15 μm or less, or may fall within a range between two values selected from the above-mentioned values.

According to certain embodiments, the width of the first protrusion 411 may be less than the width of the second protrusion 412. However, it is not limited thereto, and the width of the first protrusion 411 may be greater than the width of the second protrusion 412. According to certain embodiments, the depth of the first protrusion 411 may be less than the depth of the second protrusion 412. However, it is not limited thereto, and the depth of the first protrusion 411 may be greater than the depth of the second protrusion 412.

According to certain embodiments, at least one of the first protrusion 411 and the second protrusion 412 may include a trench shape. According to certain embodiments, at least one of the first protrusion 411 and the second protrusion 412 may have a lenticular shape. According to certain embodiments, the trench-shaped protrusion may implement a three-dimensional image without limitation, and may easily implement a large image. According to certain embodiments, one of the first protrusion 411 and the second protrusion 412 may include a hemispherical protrusion and the other may be a trench-shaped protrusion, and patterns to which various forms of three-dimensional effects are applied may be implemented on the outer surface of the electronic device housing 400 without limitation in implementing the three-dimensional image.

According to certain embodiments, at least one of the first protrusion 411 and the second protrusion 412 may include a trench shape, and the trench may include a straight line and/or a curve. For example, the trench-shaped protrusion may include a curved shape, and some may include a straight shape.

According to certain embodiments, the electronic device housing 400 may have a light transmittance rate of 50% or greater and a haze value of 30% or less. According to certain embodiments, the electronic device housing 400 may implement a visual surface texture by spectroscopy because the amount of light passing through may increase as the transmittance is increased and the haze is decreased.

Figure 5:
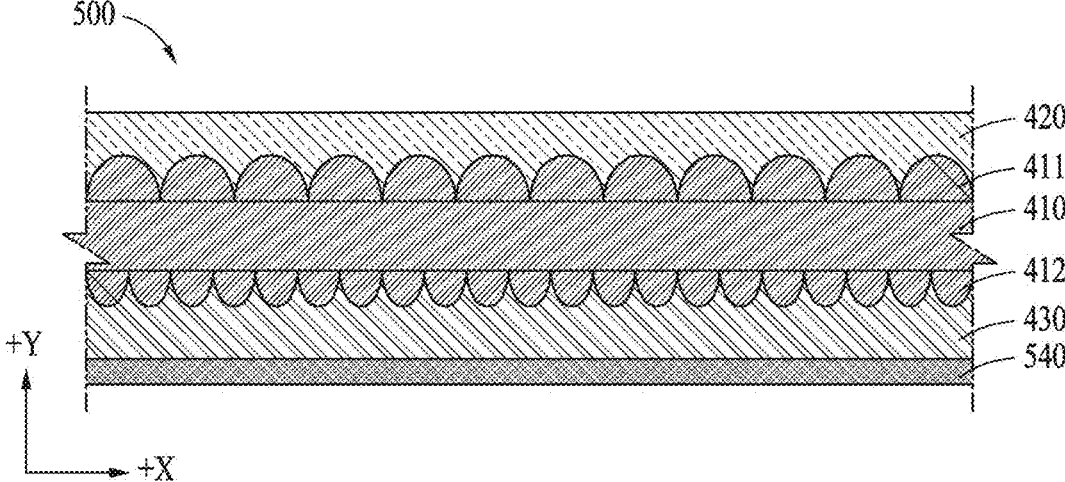
FIG. 5 is a cross-sectional view of a housing of an electronic device according to certain embodiments.

FIG. 5 is a cross-sectional view of a housing of an electronic device according to certain embodiments.

According to certain embodiments, in an electronic device housing 500, a shielding layer 540 may be further formed on the deposition layer 430. According to certain embodiments, the shielding layer 540 may shield an interior of the electronic device (e.g., the electronic device 100 of FIG. 1 and the electronic device 300 of FIG. 3) so that it is not visible from an exterior environment. According to certain embodiments, the shielding layer 540 may include various materials for shielding (e.g., electromagnetic interference (EMI) shielding) electromagnetic waves.

Figure 6:
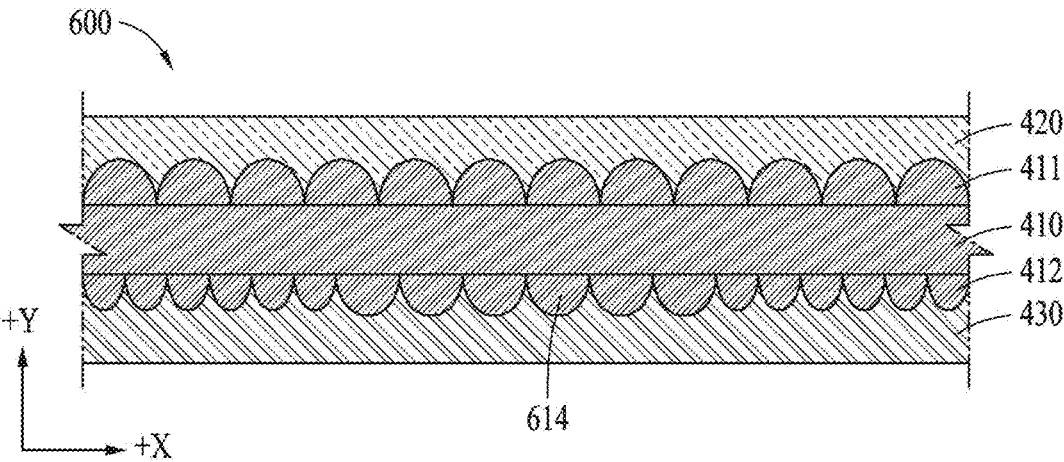
FIG. 6 is a cross-sectional view of a housing of an electronic device according to certain embodiments.

FIG. 6 is a cross-sectional view of a housing of an electronic device according to certain embodiments.

According to certain embodiments, the rear surface of the substrate 410 may further include the second protrusion 412 and a fourth protrusion 614 extending in the same direction as the protrusion direction (e.g., the second direction or −Y direction) of the second protrusion 412. According to certain embodiments, a plurality of protrusions may be formed from the substrate 410 in an outward direction; for example, a first protrusion 411 may be formed on a front surface of the substrate 410 in an outward direction (e.g., the first direction or +Y direction) from the substrate 410, and the second protrusion 412 and the fourth protrusion 614 extending in the −Y direction, which is the second direction opposite to the +Y direction, which is the first direction, may be formed on the rear surface of the substrate 410.

According to certain embodiments, the second protrusion 412 and the fourth protrusion 614 may have at least one of a width, a depth, and a pitch different from each other. According to certain embodiments, two protrusions selected from among the first protrusion 411, the second protrusion 412, and the fourth protrusion 614 may have at least one of a width, a depth, and a pitch different from each other.

According to certain embodiments, the fourth protrusion 614 may have a width, a depth, and a pitch. According to certain embodiments, the depth of the fourth protrusion 614 may be measured based on a virtual area or a surface extending in an area in which the second protrusion 412 and the fourth protrusion 614 are not formed on the rear surface of the substrate 410; and in this case, a certain distance from the highest point of the fourth protrusion 614 to the virtual area or the surface may be measured with the depth of the fourth protrusion 614. According to certain embodiments, the width of the fourth protrusion 614 may be measured based on a virtual line or a surface extending an area in which the second protrusion 412 and the fourth protrusion 614 are not formed on the rear surface of the substrate 410; and in this case, the width of the fourth protrusion 614 may be measured based on the cross-section of the fourth protrusion 614, and a distance between two points that meet the virtual line or surface may be measured with the width of the fourth protrusion 614. According to certain embodiments, the pitch of the fourth protrusion 614 may indicate a distance between the fourth protrusion 614 and may also indicate a minimum distance among the intervals between the central axes of the fourth protrusions 614. According to certain embodiments, the width, depth, and pitch of the fourth protrusion 614 may indicate an average width, an average depth, and an average pitch, respectively.

Figure 7:
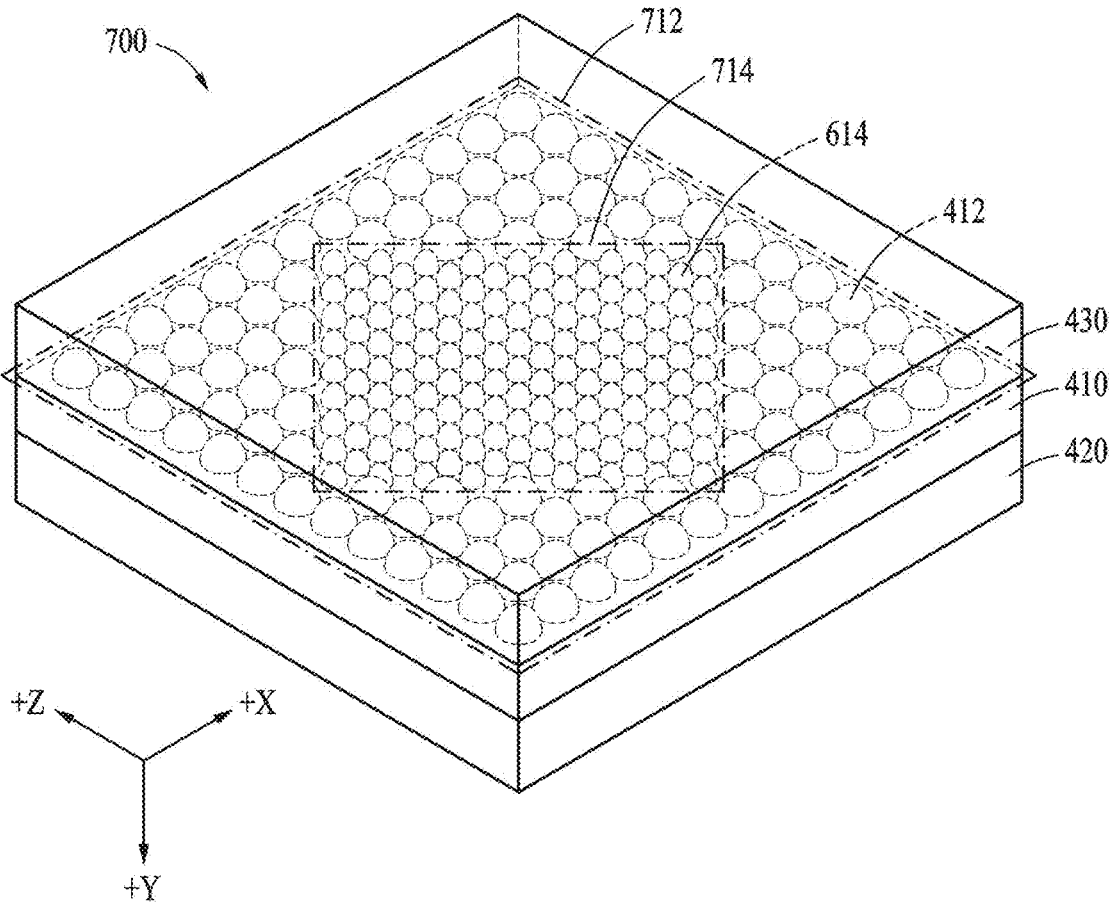
FIG. 7 is a perspective view of a housing of an electronic device according to certain embodiments.

FIG. 7 is a perspective view of a housing of an electronic device according to certain embodiments.

The electronic device housing 700 as depicted in FIG. 7 may represent a state in which the electronic device housing 600 of FIG. 6 has been turned "upside down." According to certain embodiments, the second protrusion 412 and the fourth protrusion 614 may be formed on the rear surface of the substrate 410 (e.g., the −Y direction surface of the substrate 410), and thus, the rear surface of the substrate 410 may include a first rear area 712 in which the second protrusion part 412 is formed and a second rear area 714 in which the fourth protrusion part 614 is formed.

According to certain embodiments, when viewing the rear surface of the substrate 410 on the vertical line (e.g., Y axis) of the rear surface of the substrate 410, at least one of the first rear area 712 and the second rear area 714 may have any one of a circle, a diamond, a quadrangle, a linear, and an ellipse shape. According to the embodiment of FIG. 7, the second rear area 714 in which the fourth protrusion 614 is formed among the rear surfaces of the substrate 410 may include a diamond or a quadrangle shape, and the second protrusion 412 may be formed on the rear area of the remaining substrate 410, in which the fourth protrusion 614 is not formed, so as to form the first rear area 712.

Figure 8:
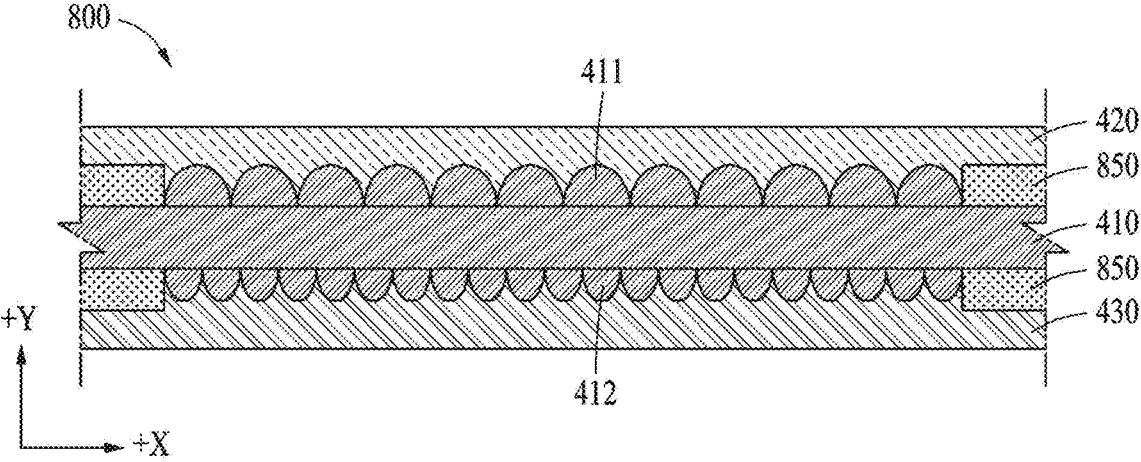
FIG. 8 is a cross-sectional view of a housing of an electronic device according to certain embodiments.

FIG. 8 is a cross-sectional view of a housing of an electronic device according to certain embodiments.

According to certain embodiments, the substrate 410 of an electronic device housing 800 may include the first protrusion 411 on the front surface, and the second protrusion 412 on the rear surface. According to certain embodiments, an outer printing layer 850 may be formed in an area in which the first protrusion 411 is not formed, on the front surface of the substrate 410. According to certain embodiments, the outer printing layer 850 may be formed in an area in which the second protrusion 412 is not formed, on the rear surface of the substrate 410.

According to certain embodiments, the outer printing layer 850 may be provided for implementing a 2D or 3D image expressing an optical effect via printing, and may be suitable for implementing a separate image other than the three-dimensional image implemented using the first protrusion 411 and the second protrusion 412.

According to certain embodiments, the deposition layer 430 and the transparent coating layer 420 may be formed to cover the outer printing layer 850. According to certain embodiments, the transparent coating layer 420 may be formed so as to contact the exterior environment, to protect the substrate 410 and the outer printing layer 850, and may reduce or prevent corrosion, contamination, scratches, and/ or wear that may occur due to interaction with an external environment. According to certain embodiments, the deposition layer 430 may provide pleasant aesthetics by increasing the surface reflectivity of the electronic device housing 800.

Figure 9:
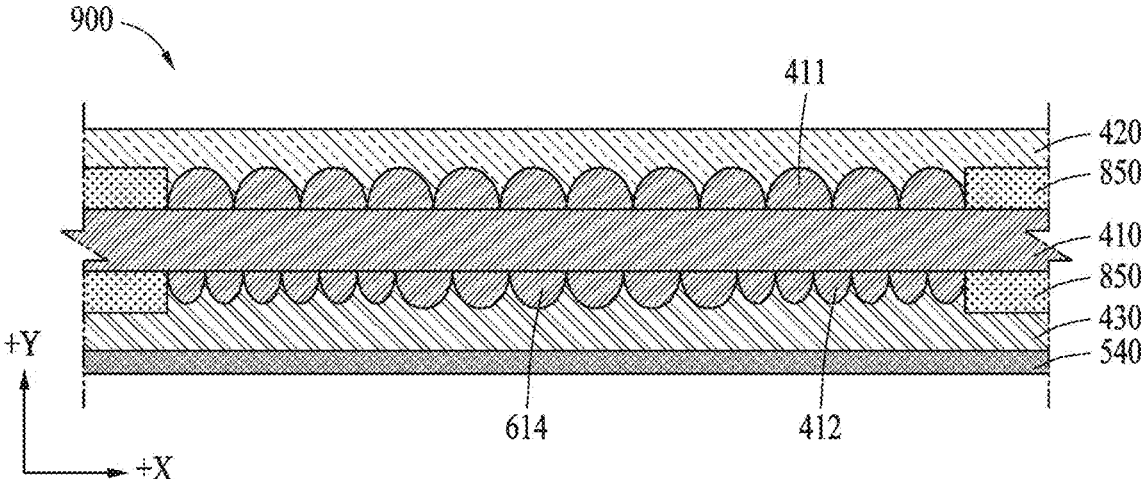
FIG. 9 is a cross-sectional view of a housing of an electronic device according to certain embodiments.

FIG. 9 is a cross-sectional view of a housing of an electronic device according to certain embodiments.

According to certain embodiments, an electronic device housing 900 may include the substrate 410, the transparent coating layer 420 formed on the front surface of the substrate 410, the deposition layer 430 formed on the rear surface of the substrate 410, and the shielding layer 540 formed on the deposition layer 430. According to certain embodiments, the front surface of the substrate 410 may include the first protrusion 411 extending in the first direction (e.g., the +Y direction) from the substrate 410 toward the exterior environment, and the rear surface of the substrate 410 may include the second protrusion 412 and the fourth protrusion 614 extending in the second direction (e.g., the −Y direction) opposite to the first direction. According to certain embodiments, the electronic device housing 900 may include the outer printing layer 850 formed in an area in which the first protrusion 411 is not formed on the front surface of the substrate 410, and the outer printing layer 850 which is formed in an area in which the second protrusion 412 and the fourth protrusion 614 is not formed on the rear surface of the substrate 410. According to certain embodiments, the transparent coating layer 420 may be formed to cover the first protrusion 411 and the outer printing layer 850, and the deposition layer 430 may be formed to cover the second protrusion 412, the fourth protrusion 614, and the outer printing layer 850.

According to certain embodiments, the substrate (e.g., the substrate 410 of FIG. 4) may include at least one of SAN, PMMA, PC, ABS, PBT, PET, and POM.

According to certain embodiments, at least one of the first protrusion (e.g., the first protrusion 411 of FIG. 4) and the second protrusion (e.g., the second protrusion 412 of FIG. 4) may be formed to include a hemispherical shape.

According to certain embodiments, the first protrusion (e.g., the first protrusion 411 of FIG. 4) may have a width of 50 μm to 150 μm and a depth of 10 μm to 30 μm.

According to certain embodiments, the second protrusion (e.g., the second protrusion 412 of FIG. 4) may have a width of 70 μm to 180 μm and a depth of 10 μm to 30 μm.

According to certain embodiments, at least one of the first protrusion (e.g., the first protrusion 411 of FIG. 4) and the second protrusion (e.g., the second protrusion 412 of FIG. 4) may have a trench shape.

According to certain embodiments, the electronic device housing (e.g., the electronic device housing 400 of FIG. 4) may have a transmittance of 50% or greater and a haze value of 30% or less.

According to certain embodiments, the electronic device housing (e.g., the electronic device housing 500 of FIG. 5) may further include the shielding layer (e.g., the shielding layer 540 of FIG. 5) formed on the deposition layer (e.g., the deposition layer 430 of FIG. 5).

According to certain embodiments, the deposition layer (e.g., the deposition layer 430 of FIG. 4) may include at least one of glass beads and silver powder.

According to certain embodiments, the rear surface of the substrate (e.g., the substrate 410 of FIG. 6) may further include the fourth protrusion protruding in the second direction (e.g., the fourth protrusion 614 of FIG. 6).

According to certain embodiments, the second protrusion (e.g., the second protrusion 412 of FIG. 6) and the fourth protrusion (e.g., the fourth protrusion 614 of FIG. 6) may have at least one of a width, a depth, and a pitch different from each other.

According to certain embodiments, the rear surface of the substrate (e.g., the substrate 410 of FIG. 7) may include the first rear area (e.g., the first rear area 712 of FIG. 7) in which the second protrusion (e.g., the second protrusion 412 of FIG. 7) is formed and the second rear area (e.g., the second rear area 714 of FIG. 7) in which the fourth protrusion (e.g., the fourth protrusion 614 of FIG. 7) is formed, and when viewing the rear surface of the substrate (e.g., the substrate 410 of FIG. 7) on a vertical line of the rear surface of the substrate (e.g., the substrate 410 of FIG. 7), at least one of the first rear area (e.g., the first rear area 712 of FIG. 7) and the second rear area (e.g., the second rear area 714 of FIG. 7) may have any one of a circle, a diamond, a quadrangle, a linear, and an ellipse shape.

According to certain embodiments, the transparent coating layer (e.g., the transparent coating layer 420 of FIG. 4) may include at least one UV curable resin of a urethane-based resin, an epoxy-based resin, and an acrylate-based resin.

According to certain embodiments, the transparent coating layer may have a refractive index of 1.5 or less.

According to certain embodiments, the deposition layer (e.g., the deposition layer 430 of FIG. 8) and the transparent coating layer (e.g., the transparent coating layer 420 of FIG. 8) formed in an area in which the first protrusion 411 (e.g., the first protrusion 411 of FIG. 8) is not formed on the front surface of the substrate (e.g., the substrate 410 of FIG. 8) and an area in which the second protrusion (e.g., the second protrusion 412 of FIG. 8) is not formed on the rear surface of the substrate (e.g., the substrate 410 of FIG. 8) may further include the outer printing layer (e.g., the outer printing layer 850 of FIG. 8) and may be formed to cover the outer printing layer (e.g., the outer printing layer 850 of FIG. 8).

According to certain embodiments, the substrate (e.g., the substrate 410 of FIG. 4) may include a plane and a curved surface.

Figure 10:
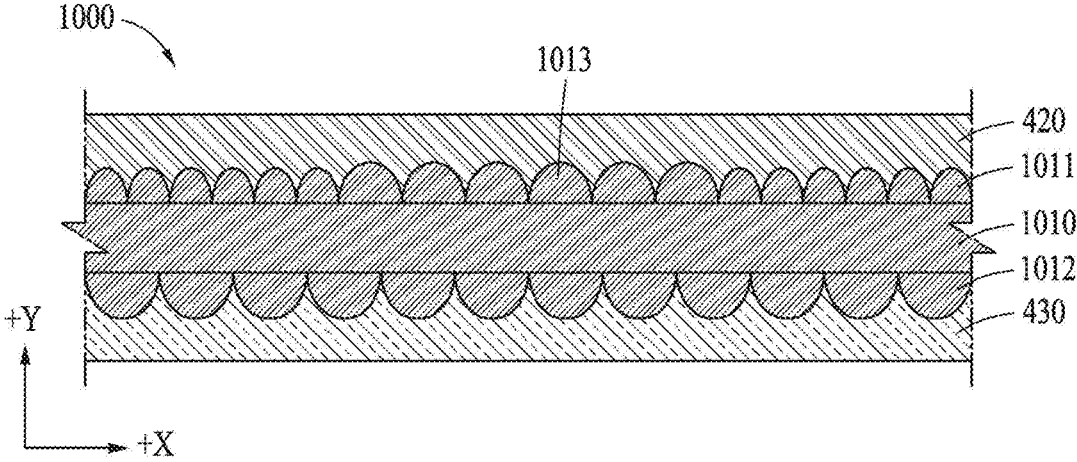
FIG. 10 is a cross-sectional view of a housing of an electronic device according to certain embodiments.

FIG. 10 is a cross-sectional view of a housing of an electronic device according to certain embodiments.

According to certain embodiments, an electronic device housing 1000 may include a substrate 1010, a transparent coating layer 420 formed on a front surface of the substrate 1010, and a deposition layer 430 formed on a rear surface of the substrate 1010.

According to certain embodiments, a protrusion may be formed on a surface of the substrate 1010. For example, a protrusion may be formed on one surface of the sheet-shaped substrate 1010, or the protrusion may be formed on one surface and the opposite surface of the one surface. According to certain embodiments, a protrusion may be formed on a surface in the +Y direction and/or a surface in the −Y direction of the substrate 1010.

According to certain embodiments, the front surface (e.g., the +Y direction surface of the substrate 1010) of the substrate 1010 may include a first protrusion (e.g., set of protrusions) 1011 extending in the first direction (e.g., the +Y direction) from the substrate 1010 toward the exterior and a third protrusion 1013 (e.g., set of protrusions) extending in the first direction (e.g., the +Y direction). According to certain embodiments, the rear surface (e.g., the −Y direction surface of the substrate 1010) of the substrate 1010 may include a second protrusion 1012 (e.g., another set of protrusions) extending in the second direction (e.g., the −Y direction) opposite to the first direction (e.g., the +Y direction). According to certain embodiments, each of the first protrusion 1011, the second protrusion 1012, and the third protrusion 1013 extend in a direction from the substrate 1010 toward the exterior, and thus the shape and size thereof are not limited.

According to certain embodiments, the transparent coating layer 420 may be formed to contact with the exterior so as to protect the electronic device housing 1000 and the substrate 1010, and may therefore reduce corrosion, contamination, scratches, and/or wear of the electronic device housing 1000 that may occur due to interaction with an external environment. According to certain embodiments, the transparent coating layer 420 may allow passthrough of light entering and exiting the electronic device housing 1000 from the exterior.

According to certain embodiments, the deposition layer 430 may be formed on the rear surface of the substrate 1010. According to certain embodiments, the deposition layer 430 may include various metal materials such as indium, titanium oxide, aluminum oxide, silver powder, or silicon oxide, and may provide pleasing aesthetics by increasing the reflectivity of the electronic device housing 1000.

According to certain embodiments, the deposition layer 430 may be formed on the rear surface of the substrate 1010. According to certain embodiments, the deposition layer 430 may include a metal paint, and desirably, may further include glass beads. For example, the deposition layer 430 may include various metal paints such as indium, titanium oxide, aluminum oxide, silver powder, or silicon oxide, and glass beads may be included in the metal paint. According to certain embodiments, the deposition layer 430 may include glass beads. According to certain embodiments, the deposition layer 430 including the glass bead may provide pleasing aesthetics by increasing the reflectivity of the electronic device housing 1000.

According to certain embodiments, each of a first protrusion 1011, a second protrusion 1012, and a third protrusion 1013 may be formed in a plurality. According to certain embodiments, each of the first protrusion 1011, the second protrusion 1012, and the third protrusion 1013 may be determined according to the shape of a mold for manufacturing the substrate 1010, and specifically, may be determined according to a pattern of an intaglio shape engraved in the mold.

According to certain embodiments, two protrusions selected from among the first protrusion 1011, the second protrusion 1012, and the third protrusion 1013 may have at least one of a width, a depth, and a pitch different from each other. According to certain embodiments, a width, a depth, and a pitch of the protrusions may mean an average width, an average depth, and an average pitch, respectively.

According to certain embodiments, patterns formed by interference and refraction of light passing through the first protrusion 1011, the second protrusion 1012, and the third protrusion 1013 may be implemented on the surface of the electronic device housing 1000.

According to certain embodiments, a protrusion may have a unique focal length. According to certain embodiments, the focal length of the first protrusion 1011, the focal length of the second protrusion 1012, and the focal length of the third protrusion 1013 may be different from one another. According to certain embodiments, light passing through the first protrusion 1011, the second protrusion 1012, and the third protrusion 1013 may cause refraction and interference to form a moire pattern, as described above.

According to certain embodiments, at least one of the first protrusion 1011, the second protrusion 1012, and the third protrusion 1013 may be formed having a hemispherical shape. According to certain embodiments, the hemispherical protrusion may avoid a three-dimensional effect constraints according to a direction, and post-processing may be more easily performed. According to certain embodiments, the first protrusion 1011 and the third protrusion 1013 may be formed on the front surface of the substrate 1010, and the second protrusion 1012 may be formed on the rear surface of the substrate 1010 to implement a 3D image with depth.

According to certain embodiments, the first protrusion 1011 and the second protrusion 1012 may have different widths and depths.

According to certain embodiments, at least one of the first protrusion 1011, the second protrusion 1012, and the third protrusion 1013 may be formed to have a trench shape. According to certain embodiments, at least one of the first protrusion 1011, the second protrusion 1012, and the third protrusion 1013 may have a lenticular shape. According to certain embodiments, the trench-shaped protrusion may implement a three-dimensional image without traditional limitation and may more easily implement a large image. According to certain embodiments, one or two protrusions from among the first protrusion 1011, the second protrusion 1012, and the third protrusion 1013 may be formed as a hemispherical protrusion, and the other one or two remaining protrusions may be formed to have a trench-shaped protrusion. Patterns to which various forms of three-dimensional effects are applied may be implemented on the outer surface of the electronic device housing 1000 without limitation in implementing the three-dimensional image.

According to certain embodiments, at least one of the first protrusion 1011, the second protrusion 1012, and the third protrusion 1013 may include a trench shape, and the trench may include a straight line and/or a curve. For example, the trench-shaped protrusion may have a curved shape, and some may have a straight shape.

According to certain embodiments, the electronic device housing 1000 may have a light transmittance rate of 50% or greater and a haze value of 30% or less. According to certain embodiments, the electronic device housing 1000 may more easily implement a visual surface texture via spectroscopy, because the amount of light passthrough increases as the transmittance is increased and the haze is decreased.

According to certain embodiments, the substrate 1010 may be formed by injection molding. According to certain embodiments, the mold may include a plurality of patterns, and may include an intaglio pattern. According to certain embodiments, the mold for manufacturing the substrate 1010 may be suitable for implementing a sheet-shaped injected object and to form two or more protrusions, including two or more intaglio patterns such as a first pattern, a second pattern, and a third pattern.

According to certain embodiments, two or more patterns (e.g., the first pattern, the second pattern, and the third pattern) may have at least one of a width, a depth, and a pitch different from each other. According to certain embodiments, the first pattern, the second pattern, and the third pattern may include a plurality of dimples or a plurality of slits, the first pattern may correspond to the first protrusion 1011 formed on the front surface of the substrate 1010 according to an embodiment of FIG. 10, the second pattern may correspond to the second protrusion 1012 formed on the rear surface of the substrate 1010 according to an embodiment of FIG. 10, and the third pattern may correspond to the third protrusion 1013 formed on the front surface of the substrate 1010 according to an embodiment of FIG. 10.

According to certain embodiments, the substrate 1010 may be formed by injection molding. According to certain embodiments, the substrate 1010 may be formed by injecting at least one polymer of SAN, PMMA, PC, ABS, PBT, PET, and POM through a mold. For example, the substrate 1010 having the first protrusion 1011, the second protrusion 1012, and the third protrusion 1013 and the electronic device housing 1000 including the same may be manufactured through a process of injecting an ultraviolet curing resin into a mold having a pattern, injecting a polymer resin into the mold, compressing it, and irradiating it with ultraviolet rays to UV-cure the resultant product.

According to certain embodiments, the injection-formed substrate 1010 may be subject to a post-processing process, such as cutting and engraving. For example, the substrate 1010 may cut the first protrusion 1011, the third protrusion 1013, and the second protrusion 1012 formed on the rear surface of the substrate 1010 using the 5-axis processing machine. The 5-axis processing machine may possess a total of five axes including three orthogonal axes and two rotational axes, and may process one surface of the substrate 1010 and then rotate the rotational axis by a desired angle to process another surface. According to another embodiment, the substrate 1010 may be subject to a post-processing process using vibration-based engraving or laser processing.

According to certain embodiments, the first protrusion 1011 and the third protrusion 1013 may be formed on the front surface (e.g., the +Y direction surface of the substrate 1010) of the substrate 1010, and accordingly, the front surface of the substrate 1010 may include a first front area where the first protrusion 1011 is formed and a second front area where the third protrusion 1013 is formed.

According to certain embodiments, when viewing a front surface of the substrate 1010 on a vertical line (e.g., the Y-axis) of the front surface of the substrate 1010, at least one of the first front area and the second front area may include any one of a circle, a diamond, a quadrangle, a linear shape, and an elliptical shape.

Figure 11:
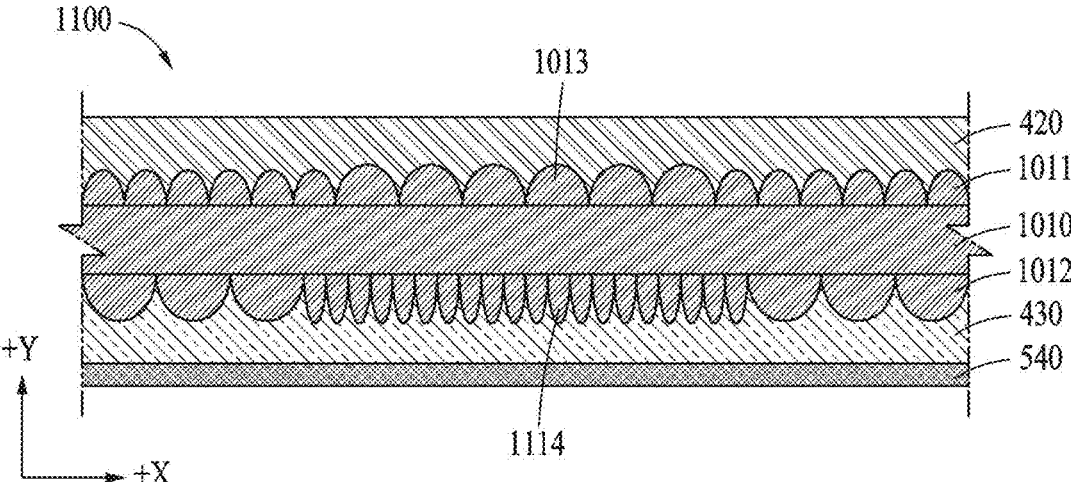
FIG. 11 is a cross-sectional view of a housing of an electronic device according to certain embodiments.

FIG. 11 is a cross-sectional view of a housing of an electronic device according to certain embodiments.

According to certain embodiments, the rear surface of the substrate 1010 may further include the second protrusion 1012 and a fourth protrusion 1114 extending in the same direction as the protrusion direction (e.g., the second direction (−Y direction)) of the second protrusion 1012. According to certain embodiments, the second protrusion 1012 and the fourth protrusion 1114 may have at least one of a width, a depth, and a pitch different from each other. According to certain embodiments, two protrusions selected from among the first protrusion 1011, the second protrusion 1012, the third protrusion 1013, and the fourth protrusion 1114 may have at least one of a width, a depth, and a pitch different from each other.

According to certain embodiments, the shielding layer 540 may be further formed on the deposition layer 430 of the electronic device housing 1100. According to certain embodiments, the shielding layer 540 may shield an interior of the electronic device (e.g., the electronic device 100 of FIG. 1 and the electronic device 300 of FIG. 3) so that it is not visible from the external environment. According to certain embodiments, the shielding layer 540 may include various materials for shielding (e.g., EMI shielding) electromagnetic waves.

According to certain embodiments, patterns formed by interference and refraction of light passing through the first protrusion 1011, the second protrusion 1012, the third protrusion 1013, and the fourth protrusion 1114 may be implemented on the surface of the electronic device housing 1100.

According to certain embodiments, the focal length of the first protrusion 1011, the focal length of the second protrusion 1012, the focal length of the third protrusion 1013, and the focal length of the fourth protrusion 1114 may be different from one another. According to certain embodiments, light passing through the first protrusion 1011, the second protrusion 1012, the third protrusion 1013, and the fourth protrusion 1114 may cause refraction and interference to form a visible moire pattern.

The electronic device according to certain embodiments include an electronic device housing. According to certain embodiments, the electronic device housing may include a front plate (e.g., the front plate 102 of FIG. 1) or a rear plate (e.g., the rear plate 111 of FIG. 2) of the electronic device, and internal components of the electronic device may be encased within the housing. Further, the housing may include at least one surface, as noted above. According to certain embodiments, the electronic device housing (e.g., the electronic device housing 400 of FIG. 4) surrounding the electronic components may include a substrate (e.g., the substrate 410 of FIG. 4), a transparent coating layer (e.g., the transparent coating layer 420 of FIG. 4) formed on the front surface of the substrate, and a deposition layer (e.g., the deposition layer 430 of FIG. 4) formed on the rear surface of the substrate, and the front surface of the substrate may include a first protrusion (e.g., the first protrusion 411 of FIG. 4) extending in a first direction from the substrate toward the exterior, and the rear surface of the substrate may include a second protrusion (e.g., the second protrusion 412 of FIG. 4) extending in a second direction opposite to the first direction. According to certain embodiments, the first protrusion (e.g., the first protrusion 411 of FIG. 4) and the second protrusion (e.g., the second protrusion 412 of FIG. 4) may have at least one of a width, a depth, and a pitch different from each other, and the focal length of the first protrusion (e.g., the first protrusion 411 of FIG. 4) and the focal length of the second protrusion (e.g., the second protrusion 412 of FIG. 4) may be different.

FIGS. 12A and 12B are actual images of an electronic device to which a housing of an electronic device is applied according to certain embodiments.

Referring to the embodiments of FIGS. 12A and 12B, patterns formed by refraction and interference of light between the first protrusion and the second protrusion may appear on the surface of the electronic device housing. According to certain embodiments, the electronic device housing may include a plate forming a rear surface of the electronic device. Light may be refracted and/or undergo interference via the first and second protrusions included in the electronic device housing, thereby enlarging an image in the manner of a convex lens, and forming various visible patterns. The patterns may be formed due to at least one difference between the position, width, depth, and pitch of the first protrusion and the second protrusion, and create a visible perspective effect viewable by a user.

According to certain embodiments, the electronic device may be at least one of a portable electronic device (e.g., a smartphone, a tablet PC, or a laptop) and a wearable electronic device (e.g., a smartwatch).

What is claimed is:

1. A electronic device housing, comprising:
a substrate;
a transparent coating layer formed on a front surface of the substrate; and
a deposition layer formed on a rear surface of the substrate,
wherein the front surface of the substrate includes a first protrusion extending in a first direction outwards from the substrate,
wherein the rear surface of the substrate includes a second protrusion extending in a second direction opposite to the first direction,
a first printing layer disposed on the front surface of the substrate, laterally adjacent to the first protrusion when viewed from above the first surface, a second printing layer disposed on the rear surface of the substrate, laterally adjacent to the second protrusion when viewed from above the rear surface,
wherein the first printing layer and the second printing layer implement a 3D image,
wherein the first protrusion and the second protrusion differ in at least one of their respective widths, depths or pitches, and
wherein a first focal length of the first protrusion and a second focal length of the second protrusion are different from each other,
wherein the substrate, the first protrusion, and the second protrusion include at least one of styrene-acrylonitrile (SAN), polymethyl methacrylate (PMMA), polycarbonate (PC), acrylonitrile butadiene styrene (ABS), polybutylene terephthalate (PBT), polyethylene terephthalate (PET), and polyoxymethylene (POM),
wherein the 3D image is formed on the deposition layer, and wherein the first and second protrusion enlarge the 3D image when the 3D image is viewed from above the front surface.

2. The electronic device housing of claim 1, wherein at least one of the first protrusion and the second protrusion is formed so as to have a hemispherical shape.

3. The electronic device housing of claim 1, wherein the first protrusion includes a width of 50 μm to 150 μm and a depth of 10 μm to 30 μm.

4. The electronic device housing of claim 1, wherein the second protrusion includes a width of 70 μm to 180 μm and a depth of 10 μm to 30 μm.

5. The electronic device housing of claim 1, wherein at least one of the first protrusion and the second protrusion is formed so as to have a trench shape.

6. The electronic device housing of claim 1, wherein the electronic device housing has a light transmittance rate of 50% or more, and a haze value of 30% or less.

7. The electronic device housing of claim 1, further comprising:
a shielding layer that is formed on a deposition layer, the deposition layer disposed below the second protrusion.

8. The electronic device housing of claim 7, wherein the deposition layer includes at least one of glass beads and silver powder.

9. The electronic device housing of claim 1, wherein the rear surface of the substrate further includes a fourth protrusion extending in the second direction.

10. The electronic device housing of claim 9, wherein the second protrusion and the fourth protrusion differ in at least one of their respective widths, depths or pitches.

11. The electronic device housing of claim 9, wherein the rear surface of the substrate includes a first rear area in which the second protrusion is formed, and a second rear area in which the fourth protrusion is formed, and
wherein at least one of the first rear area and the second rear area is formed to include one of a circle, a diamond, a quadrangle, a linear shape, and an ellipse.

12. The electronic device housing of claim 1, wherein the transparent coating layer includes at least one an ultraviolet (UV) curable resin of a urethane-based resin, an epoxy-based resin, and an acrylate-based resin.

13. The electronic device housing of claim 1, wherein the transparent coating layer has a refractive index of 1.5 or less.

14. The electronic device housing of claim 1, wherein the substrate includes a planar surface and a curved surface.

15. An electronic device housing, comprising:
a substrate;

a transparent coating layer formed on a front surface of the substrate; and a deposition layer formed on a rear surface of the substrate, wherein the front surface of the substrate includes a first protrusion extending in a first direction outwards from the substrate, and a third protrusion separate from the first protrusion extending in the first direction, wherein the rear surface of the substrate includes a second protrusion extending in a second direction opposite to the first direction, and a first printing layer disposed on the front surface of the substrate, laterally adjacent to the at least one of the first protrusion and the third protrusion when viewed from above the front surface, a second printing layer disposed on the rear surface of the substrate, laterally adjacent to the second protrusion when viewed from above the rear surface, wherein the first printing layer and the second printing layer implement a 3D image, wherein two protrusions selected from among the first protrusion, the second protrusion, and the third protrusion differ in at least one of their respective widths, depths, and pitches, wherein the substrate, the first protrusion, and the second protrusion include at least one of styrene-acrylonitrile (SAN), polymethyl methacrylate (PMMA), polycarbonate (PC), acrylonitrile butadiene styrene (ABS), polybutylene terephthalate (PBT), polyethylene terephthalate (PET), and polyoxymethylene (POM), wherein the 3D image is formed on the deposition layer, and wherein the first and second protrusion enlarge the 3D image when the 3D image is viewed from above the front surface.

16. The electronic device housing of claim 15, wherein the front surface includes a first front area in which the first protrusion is formed, and a second front area in which the third protrusion is formed, and wherein at least one of the first front area and the second front area is formed to include one of a circle, a diamond, a quadrangle, a linear shape, and an ellipse.

* * * * *